United States Patent [19]

Moore, Jr.

[11] 3,893,293
[45] July 8, 1975

[54] METHOD OF AND APPARATUS FOR CONTROL OF HELICOPTER GAS TURBINE ENGINE DURING AUTO ROTATION

[75] Inventor: Robert G. Moore, Jr., South Bend, Ind.

[73] Assignee: The Bendix Corporation, South Bend, Ind.

[22] Filed: July 26, 1973

[21] Appl. No.: 382,974

Related U.S. Application Data

[62] Division of Ser. No. 193,385, Oct. 28, 1971, Pat. No. 3,777,478.

[52] U.S. Cl............................. 60/39.03; 60/39.25
[51] Int. Cl............................................. F02c 9/08
[58] Field of Search.......... 60/39.28 R, 39.03, 39.25

[56] References Cited
UNITED STATES PATENTS

| 2,923,128 | 2/1960 | Fortmann...................... 60/39.28 R |
| 3,105,354 | 10/1963 | McCombs..................... 60/39.16 R |
| 3,309,868 | 3/1967 | Downing........................ 60/39.28 R |
| 3,516,250 | 6/1970 | Moore............................ 60/39.28 R |
| 3,526,091 | 9/1970 | Schuster....................... 60/39.28 R |
| 3,587,229 | 6/1971 | Peczkowski.................... 60/39.16 R |

Primary Examiner—Clarence R. Gordon
Attorney, Agent, or Firm—Gordon H. Chenez; William N. Antonis

[57] ABSTRACT

Engine governor control apparatus for controlling the power output of a helicopter gas turbine engine having independently rotating gas generator and power turbines. During normal operation gas generator turgine speed is sensed and controlled by a first governor and power turbine speed is sensed and controlled by a second operatively connected to the first governor for resetting the speed setting of the first governor. During helicopter practice auto-rotation, the second governor is rendered inoperative to reset the first governor at a predetermined position of a manually actuated engine power request lever to thereby eliminate transient undershoot of gas generator turbine speed during a power turbine load reduction prior to auto-rotation as well as eliminate a tendency for gas generator speed instability while operating in the practice auto-rotation mode.

2 Claims, 1 Drawing Figure

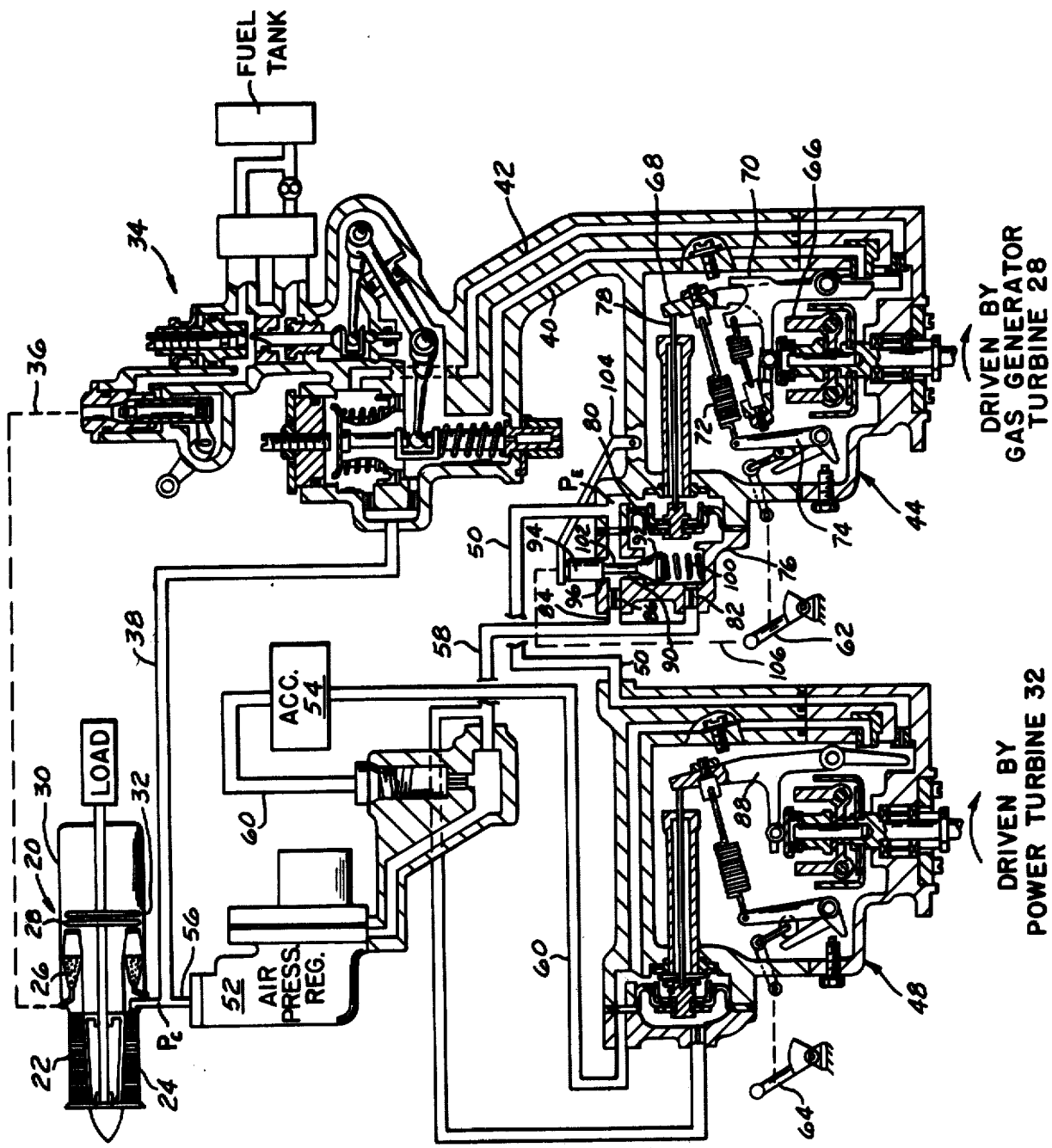

3,893,293

METHOD OF AND APPARATUS FOR CONTROL OF HELICOPTER GAS TURBINE ENGINE DURING AUTO ROTATION

This is a division of application Ser. No. 193,385, filed Oct. 28, 1971 now U.S. Pat. No. 3,777,478.

BACKGROUND OF THE INVENTION

It is a conventional practice in helicopter flight operation for a pilot to occasionally imitate an engine failure by manually actuating the engine power request lever to an engine idle position and maintaining controlled descent flight under auto-rotation of the helicopter blades or air foils. It has been found that the resulting load reduction on the power turbine driving the blades or air foils and the reset effect imposed by the second or power turbine governor on the first or gas generator governor tends to cause undesirable transient speed undershoot of the gas generator turbine and instability of speed control by the gas generator governor during the low power operation established during auto-rotation. Obviously, such lack of control over gas generator turbine speed is distracting to the pilot and may result in actual engine failure in the event that engine speed decreases below that required for self sustaining operation.

It is an object of the present invention to provide a method of gas turbine engine control wherein engine speed stability is maintained during helicopter practice auto-rotation by the pilot.

It is another object of the present invention to provide governor control apparatus for a helicopter gas turbine engine having a gas generator turbine speed governor and coacting power turbine speed governor wherein the power turbine speed governor is rendered inoperative during practice auto-rotation.

BRIEF DESCRIPTION OF THE DRAWING

The drawing represents a schematic illustration of a free turbine gas turbine engine and control system therefor embodying the present invention.

DESCRIPTION OF THE PREFERRED EMBODIMENT

Referring to the drawing, numeral 20 designates a conventional free turbine type gas turbine engine having a gas generator section 22 including an air compressor 24, combustion chambers 26 and turbine 28 connected to drive compressor 24. A power generating section 30 includes a free or power turbine 32 rotatable independently of turbine 28 in response to hot motive gases directed therethrough. The free turbine 32 is suitably connected to an external load or power absorbing device which for the purpose of the following description will be assumed to be the rotatable blades or air foils of a helicopter, not shown.

The control system for engine 20 except for the present invention adapted for use therewith is conventional and reference is made to U.S. Pat. No. 3,587,229 issued June 28, 1971 to Joseph L. Peczkowski and assigned to the present assignee for specific details of operation and structure not essential to an understanding of the present invention. However, briefly stated, the control system includes a fluid pressure responsive fuel meter 34 adapted to control fuel flow through a fuel supply conduit 36 connected to discharge fuel to combustion chambers 26. For control purposes, a pressurized air supply conduit 38 communicates compressor discharge air at pressure $P_C$ to fuel meter 34 which air pressure $P_C$ is modified internally of fuel meter 34 by vent passages 40 and 42 leading to a gas producer or generator governor 44 which senses speed of turbine 28 via suitable driving means, not shown.

A power turbine governor generally indicated by 48 senses speed of power turbine 32 and is provided with an air passage 50 connecting the same with gas generator governor 44 for imposing a reset control on governor 44 as will be described.

An air pressure regulator 52 and accumulator 54 network is supplied compressor pressurized air at pressure $P_C$ via a branch passage 56 leading from supply conduit 38. The air pressure regulator 52 regulates the compressor pressurized air supplied thereto to maintain a controlled source of air at pressure $P_R$ which is discharged to gas generator governor 44 via a passage 58 and to power turbine governor 48 via a passage 60.

Manually actuated control levers 62 and 64 connected to gas generator governor 44 and power turbine governor 48, respectively, provide reference inputs thereto.

As described in U.S. Pat. No. 3,587,229, the gas generator governor 44 includes centrifugal speed weights 66 which impose a force against coacting pivotally mounted levers 68 and 70 which, in turn, cooperate with vent passages 40 and 42, respectively, to vary the effective flow areas thereof and thus the control air pressures internally of fuel meter 34. The lever 68 is loaded with a reference force derived from a tension spring 72 connected between lever 68 and a lever 74 actuated by control lever 62.

A force producing governor reset mechanism generally indicated by 76 includes a rod 78 one end of which bears against lever 68 and the opposite end of which is fixedly secured to a diaphragm 80. The diaphragm 80 is exposed on one side to regulated pressure $P_R$ supplied thereto via passage 58 including a restriction 82. A branch passage 84 including a restriction 86 communicates passage 58 at pressure $P_R$ with the opposite side of diaphragm 80. Air passage 50 vents passage 84 downstream from restriction 86 to power turbine governor 48 which includes an output lever 88 adapted to control the effective flow area of passage 50 and thus air pressure $P_E$ imposed on diaphragm 80. The lever 88 is positioned by opposing reference input and turbine 32 speed generated forces thereby controlling the pressure differential $P_R - P_E$ across the diaphragm 80 with the resulting force output thereof being applied against lever 68 in opposition to the reference input force of spring 72.

In effect, the diaphragm 80 generated force acts to increase or decrease the effective reference input force of spring 72 depending upon the relative change in pressure $P_E$ for a given position of control lever 62.

The air pressure differential $P_R - P_E$ across diaphragm 80 may be reduced to zero thereby eliminating the reset force derived from diaphragm 80. To that end, the present invention includes a passage 90 connecting passage 58 downstream from restriction 82 with branch passage 84 downstream from restriction 86. The passage 90 is normally blocked by a valve 92 having a stem 94 slidably carried in an opening 96 in casing 98 and extending outwardly therefrom. A compression spring 100 bearing against valve 92 as well as the pressure $P_R$ acting against valve 92 loads the valve 92 to a seated position against one end of passage 90. Stem 94 is provided with an annulus 102 to permit continuous fluid communication between restriction 86 and the one side of diaphragm 80. It will be noted that the effective annular areas of valve 92 and stem 94 exposed to air pressure $P_E$ in annulus 102 are equal thereby providing a force balance.

A lever 104 has one end pivotally secured to casing 98 and an opposite end engageable with stem 94. The control lever 62 is connected via suitable actuating linkage generally indicated by 106 to lever 104. In an idle power position of control lever 62, the linkage 106 engages stem 94 and urges valve 92 against spring 100 to an open position thereby venting air at pressure $P_R$ through passage 90 to branch passage 84. The resulting equalization of pressures $P_R$ and $P_E$ establishes a zero pressure differential across diaphragm 80 and elimination of the heretofore described reset force derived therefrom. Thus, the speed control over gas generator turbine 28 is derived from gas generator governor 44 as a function of the fixed reference input force established by the control lever 62 and the existing speed force of turbine 28 generated by weights 66 which results in accurate and stable control over the gas generator speed.

The above-described preferred embodiment has been shown and described in connection with a fuel control of the pneumatic type wherein an engine compressor pressurized air is utilized in modified and/or unmodified form to provide desired control over fuel flow to the engine. However, it will be recognized that conventional fuel controls may take other forms, such as hydro-mechanical or electronic in which case the above described structure for rendering the power turbine governor inoperative during practice autorotation may be suitably modified. For instance, the power turbine governor of a hydro-mechanical fuel control may be isolated by providing a mechanically or electrically actuated shut off valve suitably positioned in the fluid circuitry of the fuel control. In an electronic fuel control the power turbine governor may be isolated by switch means suitably positioned to block electrical output signals therefrom.

I claim:

1. A method of controlling a helicopter gas turbine engine independently rotating gas generator and power output turbines and provided with a power control system including coacting first and second engine speed governor means wherein the first governor means is responsive to a first reference speed signal and speed of the gas generator turbine and the second governor means is responsive to a second reference speed signal and speed of power turbine, said method comprising the steps of:

establishing said first reference speed signal to govern said gas generator turbine at a selected speed;

establishing said second reference speed signal to govern said power turbine at a selected speed by generating an output speed error signal;

reducing said first reference speed signal to a predetermined relatively low setting to simulate an engine power failure for the purpose of helicopter practice auto-rotation;

rendering said second governor means inoperative simultaneously with said reduction in said first reference input signal to eliminate the control effect thereof on said power control system.

2. A method of controlling a helicopter gas turbine engine as claimed in claim 1 and further including the step of:

imposing said speed error signal on said first reference speed signal to modify the same accordingly.

* * * * *